United States Patent Office 3,107,027
Patented Oct. 15, 1963

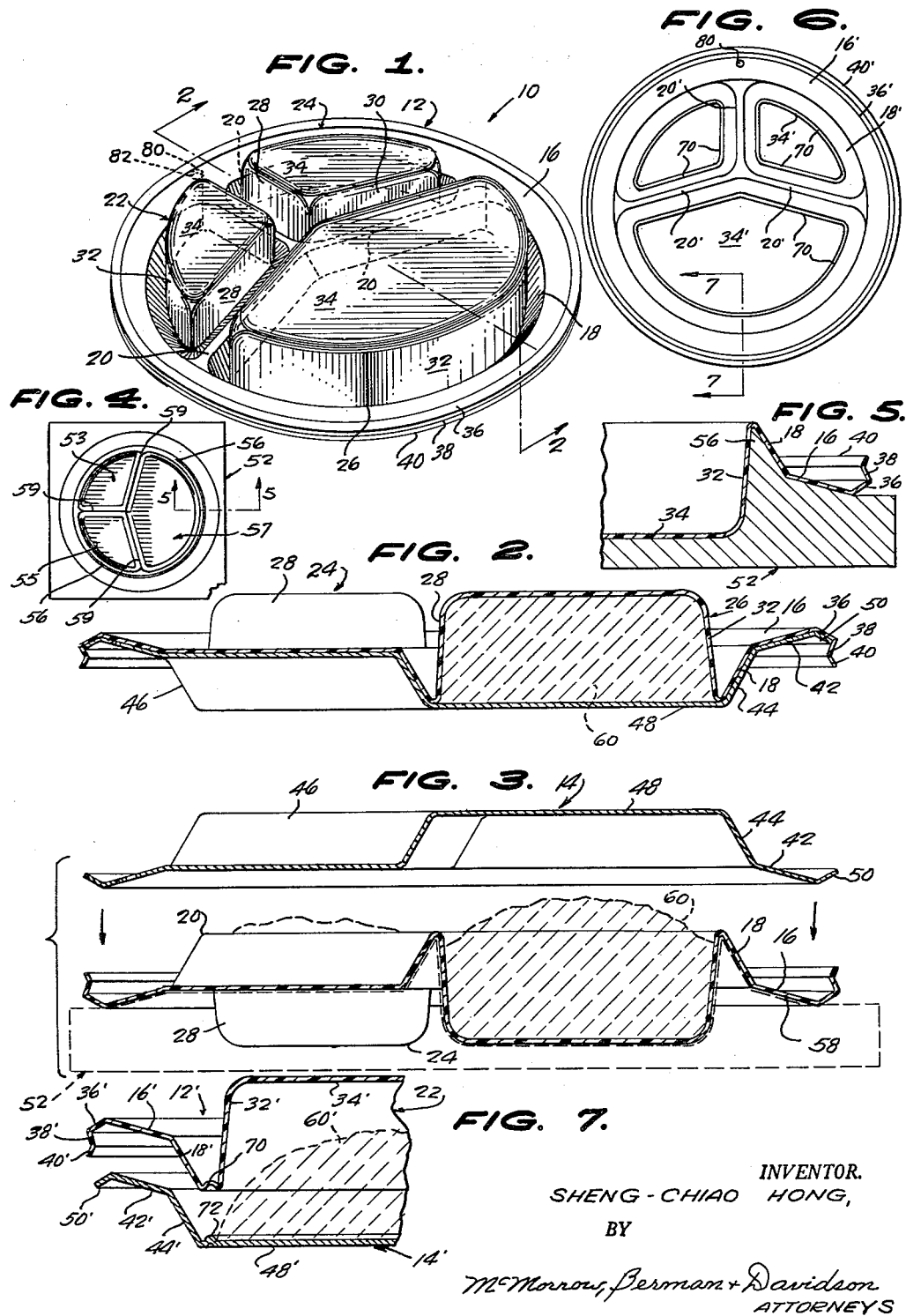

3,107,027
COMPARTMENTED CONTAINER
Sheng-Chiao Hong, 1729 E. Capitol St., Washington, D.C.
Filed Dec. 16, 1960, Ser. No. 76,259
4 Claims. (Cl. 220—23.8)

This invention relates to the general field of receptacles and, more specifically, this invention pertains to a container especially designed to receive foods, and in particular, Chinese foods.

It is well-known in this art that frozen foods such as, for example, Chinese foods, and similar foods packed in cans, jars, and other receptacles, lose much of their eye appeal and distinct tastes identifying each of the separate foods, when compared with freshly-made homemade Chinese foods. The reasons for this are manifold. For example, canned foods must be subjected to extremely high temperatures to effect the required sterilization, thus resulting, in the most part, in over-cooking the foods and thereby changing the taste and coloring of the foods. The individual identity of the ingredients which go into the preparation of these Chinese dishes is lost to a very great degree. There is, in the preparation of the frozen foods, a loss of flavor, color, and crispness, and whether or not the food product is frozen or canned, certain vegetables change their physical characteristics. For example, when celery is used the same becomes very tough and lacks the characteristic snappy or crunchy physical property so well-known to those experienced in eating the fresh product.

Aside and apart from the above disadvantages normally encountered in the preparation of frozen or canned goods, and in particular, Chinese food products, the frozen goods or food products possess a further disadvantage in that the same must be thawed before cooking or, under some circumstances, if the food product may be introduced directly into the oven, then, of course, additional time must be allowed in the processing thereof before the same may be served at the table.

These and other disadvantages are naturally inherent in the canning or freezing of food products, and in particular, Chinese and similar foods.

Thus, one of the primary objects of this invention is to provide a receptacle or container for food products, and in particular, Chinese food products, especially designed as a "carry-out" container for the Chinese foods, the foods being pre-prepared, i.e., in a home, restaurant, or some other establishment, and placed in the container for removal from the establishment to the point at which the food is to be consumed.

Another object of this invention is to provide a "carry-out" container for foods wherein provision is made for the accommodation of a plurality of different foods together with means for preventing admixture therebetween.

A further object of this invention is to provide a portable container of the compartment type to receive therein different types of foods, together with means for preventing the intermixture of the several foods disposed within the compartments.

It is a further object of this invention to provide a compartmentalized container or receptacle including a plate and cover member therefor, the plate and cover member having cooperating elements thereon to effectively seal one compartment from the next adjacent compartment.

It is within the purview of this invention to provide a compartmentalized food product container of the "carry-out" type which may, optionally, be formed of paper, plastic materials, the latter being relatively thin or rigid, as desired.

A still further object of this invention is to provide a supporting mold for receptacles of the type generally referred to supra wherein the supporting mold is formed with a plurality of pockets conforming in configuration to the compartments formed in the cover member of the receptacle, the mold being utilized when the compartments formed in the cover member are formed of a relatively thin plastic material.

Still another object of this invention is to provide a "carry-out" container wherein both the cover member and the plate element are so constructed as to permit the nesting of a plurality of each one, thereof, respectively.

This invention contemplates, as a still further object thereof, the provision of a receptacle of the type generally referred to above, the receptacle being non-complex in construction and assembly, inexpensive to manufacture, and of a disposable type.

Other and further objects and advantages of the instant invention will become more evident from a consideration of the following specification when read in conjunction with the annexed drawing, in which:

FIGURE 1 is a perspective view of a container or receptacle of the "carry-out" type constructed in accordance with this invention;

FIGURE 2 is an enlarged detail cross-sectional view, partly in elevation and showing the container or receptacle as being filled with food just prior to the removal of the cover, FIGURE 2 being taken substantially on the vertical plane of line 2—2 of FIGURE 1, looking in the direction of the arrows;

FIGURE 3 is an enlarged detail cross-sectional view, partly in elevation similar to FIGURE 2, but inverted with respect thereto, FIGURE 3 illustrating in dotted lines the mold for the cover member utilized in filling the same with a fluid product;

FIGURE 4 is a top plan view of a mold utilized in carrying out one step in the filling of the container;

FIGURE 5 is an enlarged fragmentary detail cross-sectional view taken substantially on the horizontal plane of line 5—5 of FIGURE 4, looking in the direction of the arrows, and showing a fragment of the cover element disposed therein and thereon;

FIGURE 6 is a top plan view of a cover member for the "carry-out" container, and illustrating a modification thereof; and FIGURE 7 is a fragmentary detail cross-sectional view illustrating the cover member of FIGURE 6 and a modified form of the plate element constructed in accordance with the modified form of this invention.

Referring now more specifically to the drawing, reference numeral 10 designates, in general, a "carry-out" container or receptacle constructed in accordance with the teachings of this invention. The container or receptacle 10 is a two-piece unit including a cover member 12 and a plate element 14. Of these, the cover member 12 is seen to comprise a circular flange 16 (reference being made to FIGURES 1 and 2) from which depends an inverted frusto-conical sidewall 18 interrupted at intervals by inverted substantially hollow V-shaped dividers 20 which, in this form, extend inwardly to divide the area bounded by the sidewall 18 into substantially three segments.

Reference numerals 22, 24 and 26 denote three compartments, each having a pair of elongated substantially rectangular sidewalls 28, 30 having a pair of adjacent ends integral with one another, and the respective outer ends integrally connected with the opposed ends of an arcuately-shaped sidewall 32. The upper ends of the sidewalls 28, 30, 32 are integrally connected with a closure panel or wall 34.

The compartments 22, 24, 26 are segment-shaped, and as seen in FIGURES 1 and 2, these compartments have portions thereof projecting above the flange 16, and in forming each compartment the lower edges of the sidewalls 28, 30 are integral, respectively, with the lower marginal edges of a pair of dividers 20, and each of the sidewalls 30 is integral with the lower edge of the sidewall 18. The compartments 22, 24, 26 are thus identical in construction and vary in size (capacity) only in the length of their respective definitive sidewalls 28, 30, 32, it being understood, of course, that the closure walls 34 lie in the same plane.

The flange 16 diverges upwardly and outwardly away from the sidewall 18, and the outer marginal edge of the former is integral with the downwardly and outwardly-turned peripheral flange 36, the outer marginal edge of the latter being integral with the downwardly and inwardly-turned circumferential locking tongue 38 that, in turn, is integral with an outwardly-turned circumferential lock-release lip 40 which also serves as a cam member in a manner to be described.

The plate element 14 is substantially circular in configuration and includes a circumferential flange 42 from which depends (reference again being made to FIGURES 1 and 2) an inverted frusto-conical sidewall 44 interrupted at intervals by upwardly-extending hollow substantially V-shaped dividers 46 which correspond in number and circumferential spacing to the number and spacing of the dividers 20. The base edges of the dividers 20 are integral with closure plates 48 which are also integral with the sidewall 44, and which conform to the configuration of the compartments 22, 24, 26. The arrangement and disposition of the dividers 46 and closure plates 48 are such that the dividers 20 may nest over (see FIGURES 1 and 2) the dividers 46 with the closure walls 48 extending across the open ends of the individual compartments 22, 24 and 26, the closure walls 48 being disposed in substantially the same plane.

As is seen in the several figures, the flange 42 diverges upwardly and outwardly of the sidewall 44 and terminates in a downwardly-turned circumferential latch flange 50. Again, the sidewalls 18, 44, the flanges 16, 42, the peripheral flange 36 and the latch flange 50 are nested to effect an air and liquid-tight seal. Substantially the same type of friction seal is maintained at the lines of contact of the walls 48 with the outer ends of the walls 28, 30 and 32.

It is proposed to construct the cover member 12 of a rigid or semi-rigid plastic material, preferably transparent, whereby the foods disposed within the compartments 22, 24, 26, may be viewed by the purchaser at the time of purchase, or for examination by a potential purchaser when the receptacle is filled and placed on display for retail. The plate element 14 may be formed of a plastic material, but in order to minimize production costs, the plate element may be made of any rigid paper or material which may be treated to render the same non-porous.

Reference numeral 52 denotes a substantially rectangular mold block formed of any desirable rigid material, the block having formed therein recesses 53, 55 and 57 having a segmental configuration corresponding, respectively, to the compartments 22, 24 and 26, and are adapted to receive the same therein (see FIGURE 5). The several recesses are defined away, and from the other by a plurality of upwardly-opening V-shaped grooves 59 having a depth less than the depth of the recesses 53, 55 and 57. The grooves 59 are adapted to receive the V-shaped dividers therein. The mold block 52 is also provided with an upwardly-projecting substantially circular flange 56, triangular in cross section, and which is receivable between the sidewalls 32 and adjacent portions of the sidewall 18. As is seen in the drawing, the flange 56, at its lower end, continues into a plateau 58.

Assuming that the cover member 12 is formed of a substantially rigid material and of a material which will stand the packing of foods, such as is represented at 60, under moderate pressures without deforming, the cover member 12 is placed in an upright position and is supported on any desirable substantially horizontal support device. Thereafter, the food 60 is placed in the compartments 22, 24 and 26, the foods preferably differing from one another. The food 60 may be lightly packed within the compartments and any excess may be removed by a spatula, or other similar instrument.

When the tops of the several foods have been leveled, the plate element (see FIGURE 3) is now moved downwardly thereover with the closure plates 48 extending across the open ends of the compartments 22, 24, 26, and causing the flanges 42, and 16, and sidewalls 18 and 44 to engage in surface-to-surface contact. In so effecting this contact, the latch flange 50 engages the upper or cam side of the lock-release lip 40 and since the lip 40 and the flange 50 are both formed of substantially resilient material, both will yield a minimum amount to permit the latch flange 50 to engage beneath the locking tongue 38. The two-piece container or receptacle is, thus, both sealed and locked.

Bearing in mind that the instant container or receptacle 10 has been especially designed, although not necessarily limited to, for employment as a "carry-out" container, the container is transported from the place of packaging to the destination point where the contents of the container 10 are to be consumed, or intermixed with other food ingredients.

When the destination point has been reached, the container 10 is now inverted to assume the position shown in FIGURE 1, after which the latch flange 50 and the locking tongue 38 are flexed to permit disengagement thereof, whereby the cover member 12 may be removed from the plate 14. The dividers 46 now take over the function of the dividers 20 to prevent the several foods from admixing. The foods 60 may now be consumed in any desired manner.

FIGURES 6 and 7 disclose a modification of this invention. This embodiment of the invention departs from the invention described immediately above only in two respects, and elements disclosed in FIGURES 6 and 7 having counterparts in the original or first embodiment, are distinguished therefrom through the addition of a prime mark to each reference numeral.

In the embodiment shown in FIGURES 6 and 7, the sidewalls 18', 32' at their respective apices, terminate in an upwardly-extending arcuate flange 70 which is adapted to lock over a raised bead formed at the junction of the sidewall 44' and the closure plate 48'. This further insures an airtight and liquid-tight seal between the cover member 12' and its associated plate element 14'. In all other respects, this second embodiment of the invention remains the same.

It will be understood that in the preferred embodiment of this invention, the plate 14 or 14' is formed of a paper material and is thus, substantially, opaque. Thus, unless some guide means are provided to carry out the closing of the plate element 14, 14' on the cover member 12, 12' in the manner illustrated in FIGURE 3, only trial-and-error would give the desired results. Thus, guide means are provided, the same comprising a detent 80 which projects upwardly from the flange 42 for reception within a recess or socket 82 formed in the flange 42. By using these guide means, it is only necessary to align the detent 80 with the socket 82 and carry out the closure step in FIGURE 3. The several component parts of the two embodiments of this invention will then register in the manner desired, without the trial-and-error tests which would normally have to be carried out in the absence of these guide means.

The mold block 52 is employed whenever the cover member 12 is formed of a plastic material or other similar material that may easily deform upon the application of small pressures to the food being packed in the compartments 22, 24, 26. Under such circumstances, the cover member 12 is inserted within the mold block 52 with the compartments 22, 24, 26 seating within the recesses 53, 55, 57, respectively, in the manner shown in dotted lines in FIGURE 3. The compartments are now filled and leveled in the manner described above, and the cover element 14 is then snapped down over the cover member 12.

Having described and illustrated several embodiments of this invention in detail, it will be understood that the same are offered merely by way of example, and that this invention is to be limited only by the scope of the appended claims.

While reference has been made above to the use of a spatula or other levelling utensil whereby a uniform volume of food is constantly placed in each compartment, it should also be recognized certain foods, in particular fluid or semi-fluid foods tend to be self-levelling so as not to require the services of a spatula. Similarly, other foods, for example, rice may be placed in one of the compartments and heaped above the open upper end thereof. In this case, the plate 14 is pressed downwardly thereover to compress the rice in its compartment.

What is claimed is:

1. A two-piece container or receptacle comprising a plate element and a cover member therefor, said plate element comprising an inverted frusto-conical sidewall, a plurality of first inverted substantially hollow V-shaped dividers extending inwardly from said sidewall and dividing the area bounded by said sidewall into a plurality of segment-shaped areas, a closure plate extending across the area bounded by each adjacent pair of said first dividers and that portion of said sidewall extending therebetween, said closure plates being integral with the lower marginal edges of their respective associated said first dividers and said portion of said sidewall, said sidewall projecting upwardly and outwardly of said closure plates, and said cover member comprising a substantially cylindrical sidewall normally engaging said sidewall of said plate member in side-by-side relation, a plurality of inverted substantially hollow second V-shaped dividers extending inwardly from said cover member sidewall, said inverted hollow second V-shaped dividers dividing the area bounded by said cover member sidewall into a plurality of segments, said hollow second inverted V-shaped dividers being arranged and disposed to nest over said first hollow V-shaped dividers, a compartment disposed between each adjacent pair of said second inverted V-shaped dividers and said sidewall included therebetween, said compartments extending above said cover member sidewall and its associated said second inverted V-shaped dividers, each of said compartments including a sidewall arising from the lower marginal edges of each adjacent pair of said second inverted V-shaped dividers with the adjacent ends of said last-named sidewalls integral with each other, a third arcuately-shaped sidewall arising from said cover member sidewall, the opposed ends of said arcuate sidewall being fixedly secured to the remotely-disposed ends of each integral pair of sidewalls, and a closure wall extending across the upper ends of said each integral pair of sidewalls and its associated arcuate wall.

2. A two-piece container or receptacle comprising a plate element and a cover member therefor, said plate element comprising an inverted frusto-conical sidewall, a plurality of first inverted substantially hollow V-shaped dividers extending inwardly from said sidewall and dividing the area bounded by said sidewall into a plurality of segment-shaped areas, a closure plate extending across the area bounded by each adjacent pair of said first inverted dividers and that portion of said sidewall extending therebetween, said closure plates being integral with the lower marginal edges of the respective associated said first dividers and said portion of said sidewall, said sidewall projecting upwardly and outwardly of said closure plates, said sidewall at its upper end having integrally connected therewith an upwardly and outwardly-extending circumferential flange, said flange terminating at its outer end in a downwardly-turned circumferential latch flange, and said cover member comprising an inverted frusto-conical sidewall normally engaging said sidewall of said plate member in side-by-side relation, a plurality of inverted second substantially hollow V-shaped dividers extending inwardly from said cover member sidewall, said inverted second hollow V-shaped dividers dividing the area bounded by said cover member sidewall into a plurality of segments, said inverted second V-shaped dividers being arranged and disposed to nest over said first inverted V-shaped dividers, a compartment disposed between each adjacent pair of said second inverted V-shaped dividers and said sidewall included therebetween, said compartments extending above said cover member sidewall and its associated said second inverted V-shaped dividers, each of said compartments including a sidewall arising from the lower marginal edges of each adjacent pair of said second inverted V-shaped dividers with the adjacent ends of said last-named sidewalls integral with each other, a third arcuately-shaped sidewall arising from said cover member sidewall, the opposed ends of said arcuate sidewall being fixedly secured to the remotely-disposed ends of each integral pair of said sidewalls, a closure wall extending across the upper ends of said each integral pair of sidewalls and its associated arcuate wall, said closure member sidewall being provided with an upwardly and outwardly-extending circumferential flange adapted to engage against said circumferential flange of said plate element in side-by-side relation, said last-named circumferential flange being integral at its outer end with a downwardly-turned peripheral flange which engages against said latch flange in side-by-side relation, said peripheral flange terminating at its outer end in an inwardly-turned continuous locking tongue to releasably secure said latch flange to said peripheral flange, and said locking tongue terminating in a downwardly-turned circumferential lock-release lip operable to release said latch flange from said peripheral flange whereby said cover member may be removed from said plate element.

3. A container or receptacle as defined in claim 2, and means on said plate element and said cover member cooperating to insure the nesting of said second V-shaped dividers over said first V-shaped dividers whereby said closure plates are properly aligned over their respective compartments.

4. A container or receptacle as defined in claim 3, wherein said plate element is provided with a plurality of continuous raised beads disposed along the lines of junction of said closure plates with said first V-shaped dividers and said sidewall of said plate, and said cover member adjacent the junction of said sidewalls thereof with said sidewalls of said second V-shaped dividers and said sidewall therefor is formed with a downwardly-opening arcuate groove.

References Cited in the file of this patent

UNITED STATES PATENTS

| 2,096,825 | Roman | Oct. 26, 1937 |
| 2,102,858 | Schlumbohm | Dec. 21, 1937 |
| 2,641,912 | Lawler | June 16, 1953 |
| 2,863,581 | Piker et al. | Dec. 9, 1958 |
| 2,932,386 | Ushkow | Apr. 12, 1960 |